No. 680,239. Patented Aug. 13, 1901.
I. FOX.
SPECTACLE FRAME.
(Application filed Feb. 4, 1901.)
(No Model.)
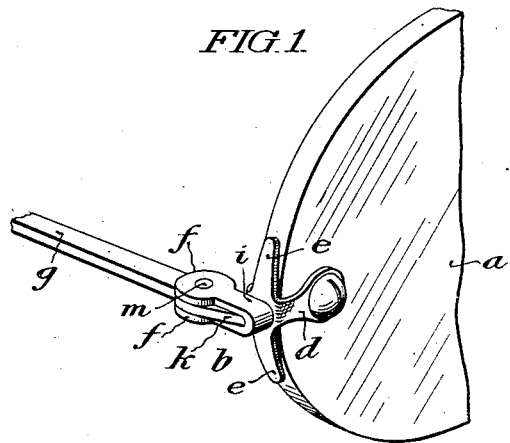
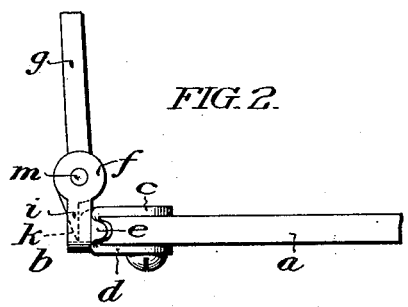
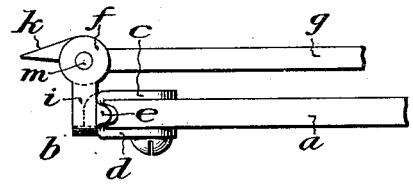
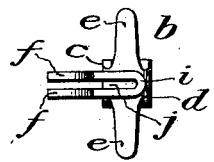
WITNESSES:
Arthur E. Paige
F. Norman Dixon
INVENTOR:
Ivan Fox
By his attorney

UNITED STATES PATENT OFFICE.

IVAN FOX, OF LANSDOWNE, PENNSYLVANIA.

SPECTACLE-FRAME.

SPECIFICATION forming part of Letters Patent No. 680,239, dated August 13, 1901.

Application filed February 4, 1901. Serial No. 45,879. (No model.)

*To all whom it may concern:*

Be it known that I, IVAN FOX, a citizen of the United States, residing at Lansdowne, Delaware county, Pennsylvania, have invented certain new and useful Improvements in Spectacle-Frames, of which the following is a specification.

In the use of spectacles as ordinarily constructed, the frequent swinging to open and closed position of the temples, which are pivotally connected at their front ends to the clasps, causes wearing away of the contacting faces of the temples and clasps in the vicinity of the pivots, with the result that the space within the clasps, in which the ends of the temples are entered, and through which the pivots pass, becomes of considerably greater breadth than the ends of the temples themselves. In the extra space thus formed the temples are free to rock lengthwise of the pivots, and therefore liable in use to occupy positions at such an angle to the lenses which they support that the lenses are not maintained in the proper relation to the eyes of the wearer.

It is the object of my invention to provide a simple, durable, economical, and efficient, spectacle frame, of such construction and arrangement that the misadjustment due to the wearing away of the metal at the temple-joints will be prevented.

In the accompanying drawings, I show and herein I describe, a good form of a convenient embodiment of my invention, the particular subject matter claim as novel being hereinafter definitely specified.

In the accompanying drawings, Figure 1 is a view in perspective of a lens clasp and a portion of a lens and a portion of a temple, said clasp and temple embodying the preferred form of my invention.

Figure 2 is a view in edge elevation of the parts shown in Figure 1, the temple being in open position.

Figure 3 is a view similar to Figure 2, the temple, however, being in closed position.

Figure 4 is a view of the lens clasp removed from the lens, the view being taken from the left hand end of Figure 2, and the temple being supposed removed.

Similar letters of reference indicate corresponding parts.

In the accompanying drawings, $a$ indicates a lens of any usual character, but happening to be illustrated as one of the frameless-type, and it is accordingly fitted with a clasp $b$, the basal portion of which is of the construction usually resorted to in the mounting of clasps upon frameless lenses, that is to say, said basal portion is provided with the legs $c$ $d$ which embrace the opposing faces of the lens and are secured thereto by a screw or pivot, and provided also with the leaves $e$ extending in opposite directions along the edge of the lens to brace the clasp in position thereon. The clasp $b$, whatever its general basal construction, is provided with a pair of cheek pieces $f$ arranged in parallelism, in the space between which the inner or front end of the temple $g$ is entered and secured by a pivot.

In my improved construction the clasp and temple are formed, the one with a recess and the other with a tongue or portion adapted to enter said recess when the temple is in open position, with the result that the engagement of said tongue or portion in said recess secures the temple against rocking movement lengthwise of the pivot. In the construction illustrated the cheek pieces referred to are formed at the extremities of a strip of metal $i$ bent to the form of a U-shaped loop mounted on the clasp conveniently by being soldered to the basal portion already described, the bight of said loop being attached to said basal portion and its extremities extending rearwardly out of the plane of the lenses. There is thus formed a free space or locking recess designated $j$ between the respective side pieces of the U-shaped loop, in the vicinity of its bight. The temple, which is otherwise of ordinary construction, is secured by the pivot $m$ in the cheek pieces, but in my construction said temple is provided with a projection or tongue $k$ adapted, when the temple is carried to open position, to automatically engage in said recess, but when the temple is moved toward closed position, as in Figure 3, to be carried out of said recess.

The tongue which constitutes, in the construction illustrated, in effect a prolongation of the temple, by its engagement in said recess between the walls of which it fits, secures the temple against material rocking or other movement in a line in parallelism with the pivot $m$. The distance from the pivot $m$ to the extremity of the tongue is such that even when the contacting faces of the temple and the cheek pieces become considerably worn, the only possible movement of the temple lengthwise of said pivot $m$ will be of no moment.

The temple is in the beginning of its movement to closed position, carried as to its projecting end out of the recess, and accordingly in nearly the whole of such movement said projecting end is maintained out of contact with the metal of the clasp.

There is therefore in the movement of the temple alternately to open and closed positions, practically no wearing contact between the upper and lower faces of the temple prolongation and the inner faces of the locking recess of the clasp.

Obviously therefore an accurate fit between said prolongation and the opposing walls of the locking recess will be maintained through a long period of use of the spectacle frames.

The locking recess $j$, as will be understood from a consideration of the particular embodiment of my invention I elect to illustrate, constitutes, so to speak, a lock which, as the temple is swung or moved to open position, is automatically engaged by the entrance of the temple end thereinto, said lock being disengaged or vacated by or in the movement of the temple to closed position.

While I have illustrated and hereinbefore described a workmanlike and efficient embodiment of my invention, it is to be understood that other forms of construction designed to effectuate the same result may be resorted to, without departure from the spirit of my invention.

Having thus described my invention, I claim—

1. In a spectacle, a lens clasp or the like and a temple, and a pivotal connection between said clasp and temple, said clasp having a recess which receives the temple when the temple is in open position and out of which the temple passes in its movement to closed position, substantially as set forth.

2. In a spectacle, a lens clasp or the like and a temple, pivotally engaged, one of said devices having a tongue and the other a recess, said tongue engaging in said recess when the temple is in open position and being carried out of said recess by the movement of the temple to closed position.

3. In combination, a spectacle lens, a clasp or the like mounted thereon and extending rearwardly from said lens and having a recess in its outer face and a pair of cheek pieces at its rear end, and a temple pivotally engaged between said cheek pieces and having an extension adapted to enter said recess when the temple is brought to open position, substantially as set forth.

4. In a spectacle frame, or mounting in combination with a temple, a lens clasp or the like, and a connecting pivot, a lock adapted to restrain the temple from rocking movement lengthwise of the pivot, and which is automatically engaged when the temple is brought to open position and disengaged in the movement of the temple to closed position.

5. In combination, a spectacle clasp consisting of a basal portion and a temple engaging portion, which temple engaging portion is of the form of a U-shaped loop and is secured to said basal portion, and a temple pivotally mounted between the extremities of the U-shaped loop and provided with a tongue or extension adapted in the movement of the temple to be carried into and out of the space between the side walls of the U-shaped loop, substantially as set forth.

6. In a spectacle, a clasp provided with two narrow flat strips of sheet metal extending in parallelism in planes perpendicular to that of the lens of the spectacle, a temple passing between the rear ends of said strips, and a pivot passing through the rear ends of said strips and through the temple at a point to the rear of its front end portion, the front end portion of the temple in the pivotal movement of the temple being carried alternately into and out of position between the bodies of said strips, substantially as set forth.

In testimony that I claim the foregoing as my invention I have hereunto signed my name this 24th day of January, A. D. 1901.

IVAN FOX.

In presence of—
S. SALOME BROOKE,
THOS. K. LANCASTER.